United States Patent
Das et al.

(10) Patent No.: US 7,950,015 B2
(45) Date of Patent: May 24, 2011

(54) SYSTEM AND METHOD FOR COMBINING SERVICES TO SATISFY REQUEST REQUIREMENT

(75) Inventors: Rajarshi Das, New Rochelle, NY (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 11/845,508

(22) Filed: Aug. 27, 2007

(65) Prior Publication Data
US 2007/0294386 A1 Dec. 20, 2007

Related U.S. Application Data

(63) Continuation of application No. 10/252,324, filed on Sep. 20, 2002, now abandoned.

(51) Int. Cl.
*G06F 9/46* (2006.01)
*G06F 15/173* (2006.01)
(52) U.S. Cl. ........................... 718/104; 709/226
(58) Field of Classification Search ............... 709/226; 718/104
See application file for complete search history.

(56) References Cited

U.S. PATENT DOCUMENTS

| | | |
|---|---|---|
| 5,638,494 A | 6/1997 | Pinard et al. |
| 5,701,400 A | 12/1997 | Amado |
| 5,790,789 A | 8/1998 | Suarez |
| 5,805,776 A | 9/1998 | Juengst et al. |
| 5,832,467 A | 11/1998 | Wavish |
| 5,909,544 A | 6/1999 | Anderson, II et al. |
| 5,935,264 A | 8/1999 | Nevill et al. |
| 5,978,911 A | 11/1999 | Knox et al. |
| 6,023,586 A | 2/2000 | Gaisford et al. |
| 6,026,374 A | 2/2000 | Chess |
| 6,055,562 A | 4/2000 | Devarakonda et al. |
| 6,125,359 A | 9/2000 | Lautzenheiser et al. |
| 6,182,245 B1 | 1/2001 | Akin et al. |
| 6,199,204 B1 | 3/2001 | Donohue |
| 6,216,173 B1* | 4/2001 | Jones et al. .................. 715/705 |
| 6,219,829 B1 | 4/2001 | Sivakumar et al. |
| 6,256,771 B1 | 7/2001 | O'Neil et al. |
| 6,286,131 B1 | 9/2001 | Beers et al. |

(Continued)

FOREIGN PATENT DOCUMENTS

EP 1134658 A2 9/2001

(Continued)

OTHER PUBLICATIONS

Itae et al., "DANSE: Dynamically Adaptive Networking Service Environment", NTT R&D, The Telecommunication Association, Mar. 10, 2001, vol. 50, No. 3, pp. 10-20.

(Continued)

*Primary Examiner* — H. S. Sough
*Assistant Examiner* — Charles E Anya
(74) *Attorney, Agent, or Firm* — Yee & Associates, P.C.; Stephen C. Kaufman

(57) ABSTRACT

A method, computer program product, and data processing system for providing an improved directory service for storing information about hardware and software components is disclosed. The directory service stores not only the information that other hardware and software components require to locate, and make use of, the components listed in the directory, but is also able to dynamically construct 'meta services' that fulfill a client's functionality requirements.

30 Claims, 6 Drawing Sheets

U.S. PATENT DOCUMENTS

| | | | |
|---|---|---|---|
| 6,330,561 | B1 | 12/2001 | Cohen et al. |
| 6,330,586 | B1 | 12/2001 | Yates et al. |
| 6,353,897 | B1 | 3/2002 | Nock et al. |
| 6,360,331 | B2 | 3/2002 | Vert et al. |
| 6,463,584 | B1 | 10/2002 | Gard et al. |
| 6,467,088 | B1 | 10/2002 | AlSafadi et al. |
| 6,473,794 | B1 | 10/2002 | Guheen |
| 6,529,950 | B1 | 3/2003 | Lumeslky et al. |
| 6,567,957 | B1 | 5/2003 | Chang et al. |
| 6,584,455 | B1 | 6/2003 | Hekmatpour |
| 6,631,367 | B2 | 10/2003 | Teng et al. |
| 6,751,608 | B1 | 6/2004 | Cohen et al. |
| 6,779,016 | B1 | 8/2004 | Aziz et al. |
| 6,804,709 | B2 | 10/2004 | Manjure et al. |
| 6,834,341 | B1 | 12/2004 | Bahl et al. |
| 6,851,115 | B1 | 2/2005 | Cheyer et al. |
| 6,892,218 | B2 | 5/2005 | Heddaya et al. |
| 6,912,532 | B2 | 6/2005 | Andersen |
| 6,957,393 | B2 * | 10/2005 | Fano et al. .................... 715/747 |
| 6,970,869 | B1 | 11/2005 | Slaughter et al. |
| 7,024,487 | B2 * | 4/2006 | Mochizuki et al. .......... 709/238 |
| 7,185,342 | B1 | 2/2007 | Carrer et al. |
| 2002/0087668 | A1 | 7/2002 | San Martin et al. |
| 2002/0100036 | A1 | 7/2002 | Moshir et al. |
| 2002/0120685 | A1 | 8/2002 | Srivastava et al. |
| 2002/0143819 | A1 | 10/2002 | Han et al. |
| 2002/0174414 | A1 | 11/2002 | Matsuo et al. |
| 2002/0183866 | A1 | 12/2002 | Dean et al. |
| 2003/0023710 | A1 | 1/2003 | Corlett et al. |
| 2003/0046615 | A1 | 3/2003 | Stone |
| 2003/0154279 | A1 | 8/2003 | Aziz |
| 2003/0200293 | A1 | 10/2003 | Fearn et al. |
| 2003/0212924 | A1 | 11/2003 | Avvari et al. |
| 2003/0235158 | A1 | 12/2003 | Lee et al. |
| 2004/0236843 | A1 | 11/2004 | Wing et al. |

FOREIGN PATENT DOCUMENTS

| | | |
|---|---|---|
| JP | 11-015849 | 1/1999 |
| WO | 02093290 A2 | 11/2002 |

OTHER PUBLICATIONS

Van Den Heuvel W-J et al: "Service Representation, Discovery, and Composition for E-marketplaces", Cooperative Information Systems. 9th International Conference Coopis 2001. Proceedings (Lecture Notes in Computer Science vol. 2172), Proceedings, Trento, Italy, Sep. 5-7, 2000, pp. 270-284.

Piccinelli et al., "Dynamic Service Aggregation in Electronic Marketplaces", Computer Networks 37 (2001), Elsevier Science Publishers B.V., Amsterdam, NL, vol. 37, No. 2, Oct. 2001, pp. 95-109.

Guttman, "Service Location Protocol: Automatic Discovery of IP Network Services", IEEE Internet Computing, IEEE Service Center, Piscataway, NJ, US, vol. 3, No. 4, Jul. 1, 1999, pp. 71-80.

Feng et al., "Updating Semantic Information to Support Coordination in Distributes Software Development Environments", p. 13-22, 1993 IEEE, retrieved from IEEE database Mar. 4, 2004.

Gavrilovska et al., "A Practical Approach for 'Zero' Downtime in an Operational Information System", Jul. 2002, retrieved from IEEE database Mar. 4, 2004.

Panagos et al., "Synchronization and Recovery in a Client-Server Storage System", p. 209-223, 1997 The VLDB Journal, retrieved from ACM Portal database Mar. 4, 2004.

Yajnik et al., "STL: A Tool for On-Line Software Update and Rejuvenation", p. 258, 1997 IEEE, retrieved from IEEE database Mar. 4, 2004.

IBM Technical Disclosure Bulletin, Mar. 2002, No. 455, p. 499, "Distributed UDDI (Universal Description Discovery and Integration) Registry Lookup and Storage".

Bagchi et al., "Dependency Analysis in Distributed Systems using Fault Injection: Application to Problem Determination in an e-commerce Environment", Distributed Operations and Management, 2001, 11 pages.

Brown et al., "An Active Approach to Charactarizing Dynamic Dependencies for Problem Determination in a Distributed Environment", Seventh IFIP/IEEE International Symposium on Integrated Network Management, 2001, 14 pages.

Butler et al., "Error Burst Metric for Failure Trajectory Analysis", International Transmission System, IEE Colloquium, The Institution of Electrical Engineers, 1994, IEE, Savoy Place, London WC2R 0BL, UK, 4 pages.

Goswami et al., "Prediction-Based Dynamic Load-Sharing Heuristics", IEEE Transactions on Parallel and Distributed Systems, vol. 4, No. 6, Jun. 1993, pp. 638-648.

Hellerstein, "An Approach to Selecting Metrics for Detecting Performance Problems in Information Systems", Proceedings of the Second International Conference on Systems Management, Jun. 19-21, 1996, Toronto, Canada, pp. 1-11.

Hellerstein et al., "Mining Event Data for Actionable Patterns", IBM Thomas J. Watson Research Center, Hawthorne, New York, The Computer Management Group, 2000, 12 pages.

Keller et al.,"Classification and Computation of Dependencies for Distributed Management", Proceedings of the Fifth IEEE Symposium on Computers and Communications, 2000, pp. 78-83.

Quinlan et al., "Induction of Logical Program: FOIL and Related Systems", New Generation Computing 13, 1995, pp. 287-312, 28 pages.

Lee et al., "Error/Failure Analysis Using Event Logs from Fault Tolerant Systems", Fault-Tolerant Computing, 1991, FTCS-21. Digest of Papers, Twenty-First International Symposium, 1991, pp. 10-17.

Ma et al., "Mining Mutually Dependent Patterns", IEEE Conference on Data Mining, 2001, pp. 1-20.

Tang et al., "Analysis and Modeling of Correlated Failures in Multicomputer Systems", IEEE Transactions on Computers, vol. 41, No. 5, May 1992, pp. 567-577.

Thottan et al., "Proactive Anomaly Detection Using Distributed Intelligent Agents", IEEE Network, Sep./Oct. 1998, pp. 21-27.

Vilalta et al., "Predictive Algorithms in the Management of Computer Systems", IBM Systems Journal, vol. 41, No. 3, 2002, pp. 461-474.

Rouvellou et al., "Combining Different Business Rules Technologies: A Rationalization", Proc. Of the OOPSLA 2000 Workshop on Best-Practices in Business Rule Design and Implementation, Minneapolis, MN, Oct. 2000, pp. 1-6.

Grosof, IBM Research Report RC20836, "Courteous Logic Programs: Prioritized Conflict Handling for Rules", May 1997, 63pp.

Stevens, "18.2 Connection Establishment and Termination", TCP/IP Illustrated, vol. 1: The Protocols, Addison-Wesley, 1994, pp. 15-16, 229-234.

Newton's Telecom Dictionary, "Denial of Service Attack", Feb. 2002, CMP Books, 18th Edition, p. 214.

IEEE 100 The Authoritative Dictionary of IEEE Standards Terms, "failover", Dec. 2000, Standards Information Network IEEE Press, Seventh Edition, p. 413.

Addis et al., "Negotiating for Software Services", 2000, IEEE, pp. 1039-1043.

Faratin, "Automated Service Negotiation Between Autonomous Computational Agents", Dec. 2000, University of London, Department of Electronic Engineering, Queen Mary & Westfield College, pp. 1-255. http://ccs.mit.edu/peyman/pubs/peyman-thesis.pdf.

Faratin et al., "Using Similarity Criteria to Make Negotiation Trade-Offs", 2000, IEEE, pp. 1-8.

http://www.ibm.com/research/autonomic, "Autonomic Computing: IBM's Perspective on the State of Information Technology", Oct. 2001, pp. 1-40.

Ma et al., "Event Browser: A Flexible Tool for Scalable Analysis of Even Date", Distributed Operations and Management, 1999, pp. 1-12.

* cited by examiner

SYSTEM AND METHOD FOR COMBINING SERVICES TO SATISFY REQUEST REQUIREMENT

CROSS REFERENCE TO RELATED APPLICATIONS

This application is a continuation of application number 10/252,324, filed Sep. 20, 2002, now abandoned.

The present invention is related to the following applications entitled: "Method and Apparatus for Publishing and Monitoring Entities Providing Services in a Distributed Data Processing System", Ser. No. 10/252,816, "Method and Apparatus for Automatic Updating and Testing of Software", Ser. No. 10/252,868, "Self-Managing Computing System", Ser. No. 10/252,247, and "Adaptive Problem Determination and Recovery in a Computer System", Ser. No. 10/252,979, all filed even date hereof, assigned to the same assignee, and incorporated herein by reference.

BACKGROUND OF THE INVENTION

1. Technical Field

The present invention relates generally to an improved data processing system, and in particular, to a method and apparatus for managing hardware and software components. Still more particularly, the present invention provides a method and apparatus for automatically identifying and combining components to achieve functionality requirements.

2. Description of Related Art

Modern computing technology has resulted in immensely complicated and ever-changing environments. One such environment is the Internet, which is also referred to as an "internetwork." The Internet is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). The Internet also is widely used to transfer applications to users using browsers. Often times, users of may search for and obtain software packages through the Internet.

Other types of complex network data processing systems include those created for facilitating work in large corporations. In many cases, these networks may span across regions in various worldwide locations. These complex networks also may use the Internet as part of a virtual product network for conducting business. These networks are further complicated by the need to manage and update software used within the network.

As software evolves to become increasingly 'autonomic', the task of installing and configuring software will, more and more, be performed by the computers themselves, as opposed to being performed by administrators. The current installing and configuring mechanisms are moving towards an "autonomic" process. For example, many operating systems and software packages will automatically look for particular software components based on user-specified requirements. These installation and update mechanisms often connect to the Internet at a preselected location to see whether an update or a needed component is present. If the update or other component is present, the message is presented to the user in which the message asks the user whether to download and install the component. An example of such a system is the package management program "dselect" that is part of the open-source Debian GNU/Linux operating system.

A next block towards "autonomic" computing involves identifying and installing/downloading necessary hardware and software components without requiring user intervention. In such a next generation system, an autonomic configuration utility would install components in response to the detection of a need for particular functionality. In such a circumstance, there may not be a single hardware or software component for providing the needed functionality. Thus, it would be desirable for there to be a scheme whereby needed functionality may be obtained in the absence of a single component for providing the necessary functionality.

SUMMARY OF THE INVENTION

The present invention is directed toward a method, computer program product, and data processing system for providing an improved directory service for storing information about hardware and software components. The directory service stores not only the information that other components require to locate, and make use of, the components listed in the directory, but is also able to dynamically construct 'meta services' that fulfill a client's functionality requirements.

In response to a request from the client for particular functional requirements, the directory service determines a set of hardware and/or software components to provide the needed functionality. The components in the set are then combined and configured to achieve the necessary functionality via logical deduction from domain knowledge. A history mechanism allows for already derived configurations of hardware or software components to be recalled immediately.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
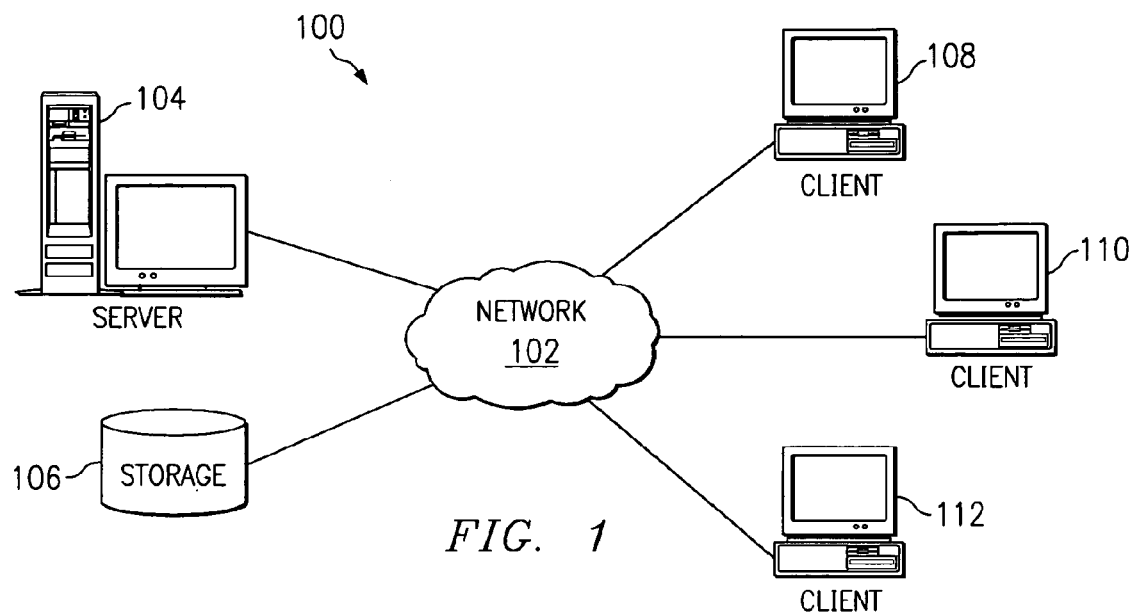
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
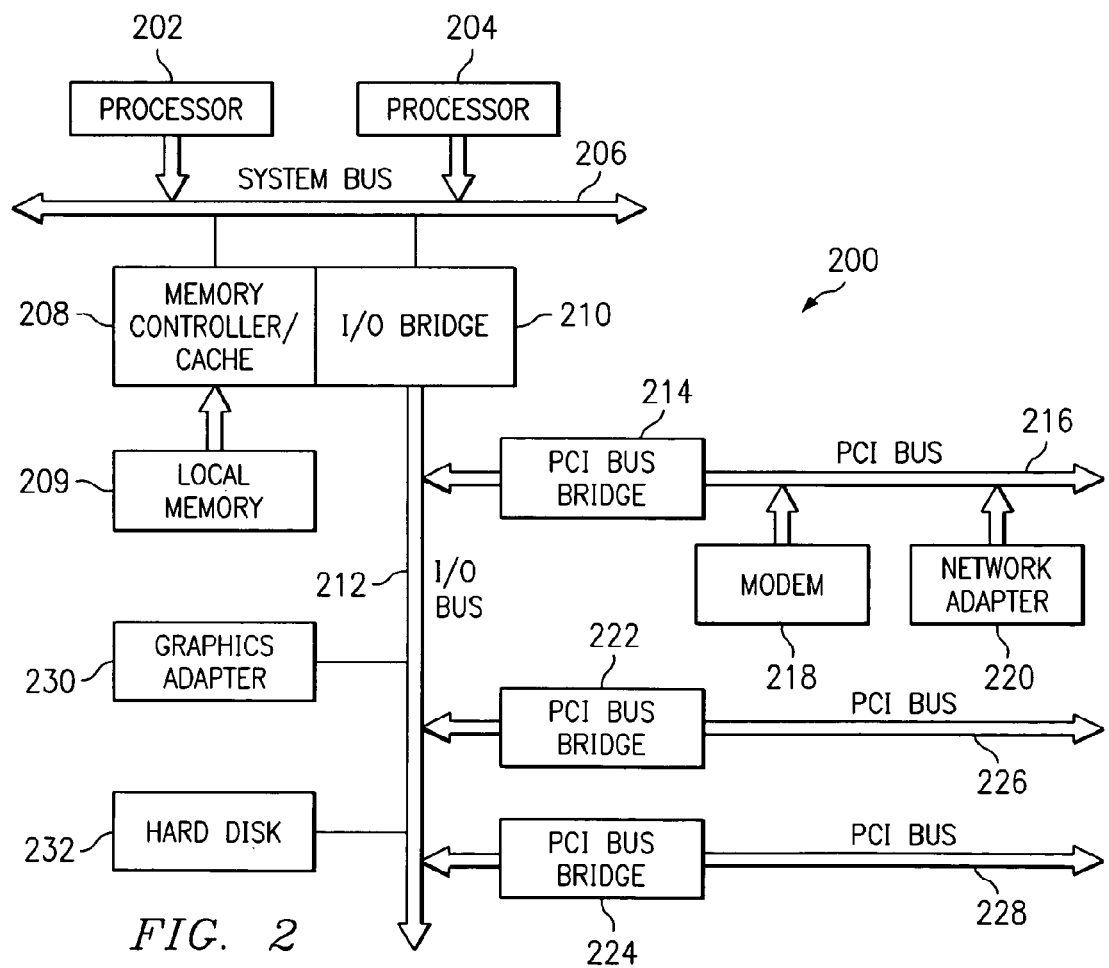
FIG. 2 is a block diagram of a server system within the networked data processing system of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
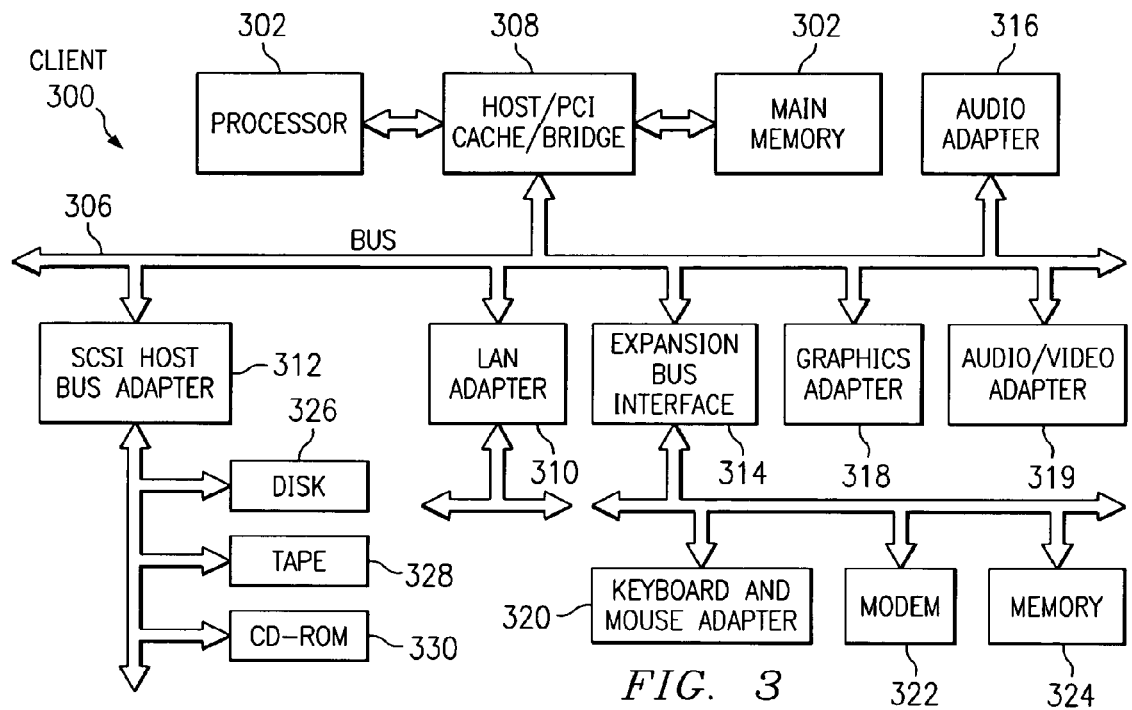
FIG. 3 is a block diagram of a client system within the networked data processing system of FIG. 1.

With reference now to FIG. 3, a block diagram illustrating a data processing system is depicted in which the present invention maybe implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention is directed toward an improved directory service for storing information about hardware and software components. Throughout this document, the term "service" is used to described both hardware and software components. In an autonomic computing paradigm, services may be procured and combined (bound) dynamically according to functional requirements. Thus, hardware and software components in an autonomic computing environment are referred to as "services" to emphasize the fact that in autonomic computing, the system components are deployed for current functional requirements only. Thus, an autonomic computing system is not statically constructed at build time from a fixed and unchanging set of components, but rather dynamically utilizes available "services" as required.

Sometimes the functionality required of an autonomic computing system cannot be provided by a single service alone. In such cases, the required functionality may be achieved by combining a number of services together. Thus, the directory service provided by the present invention stores not only the information that other components require to locate, and make use of, the services listed in the directory, but is also able to dynamically construct "meta-services" that fulfill a client's request.

For example, if a client asks the directory to provide details for a certain type of service (including, but not limited to, the location or identity of that service) that is not available in the directory, then a simple directory service would simply respond that no such services were available. However, the improved directory service has the capability to derive (or to cause another software entity to derive), either based on pre-programmed knowledge or on-the-fly deduction, a mechanism by which components available in the directory may be combined in order to obtain functionality equivalent to that of the services originally sought by the requesting client.

Consider, for example, a situation where a requesting service (e.g., a software component) asks the directory for information about available services that can provide 1 PB (Petabyte) of direct-access storage space. In the case where the directory does not contain information about any such services, but does contain information about ten services, each of which can provide 100 TB (Terabytes) of direct-access storage space, the directory service can then return a response to the requesting service indicating that if the requesting service combined the ten services, it would obtain the equivalent of the service that was originally requested.

Figure 4:
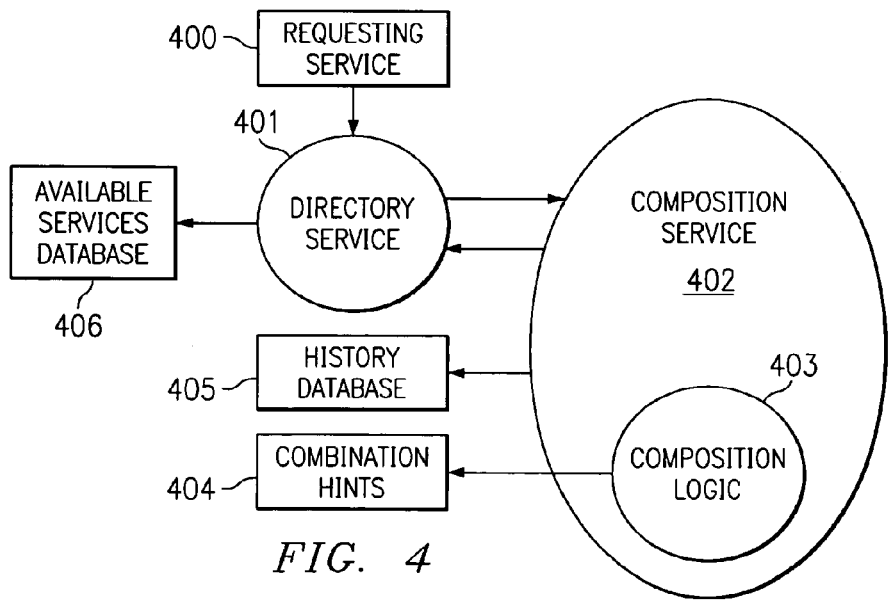
FIG. 4 is a diagram depicting an overall view of an autonomic composition broker system in accordance with a preferred embodiment of the present invention.

FIG. 4 is a diagram depicting an overall view of a directory and composition service in accordance with a preferred embodiment of the present invention. A requesting service 400 requests a service meeting particular functionality requirements from directory service 401, which is itself a service (hardware or software component). Directory service 401 consults available services database 406 to locate a service (hardware or software component) providing the necessary functionality. Should no such single service be available, directory service 401 may utilize composition service 402 (which is also a hardware or software component) to combine individual services into a "meta-service" to provide the necessary functionality.

In a preferred embodiment, directory service 401 may provide directory services through the use of standardized directory service schemes such as Web Services Description Language (WSDL) and systems such as Universal Description, Discovery, and Integration (UDDI), which allow a program to locate entities that offer particular services and to automatically determine how to communicate and conduct transactions with those services. WSDL is a proposed standard being considered by the WorldWide Web Consortium, authored by representatives of companies, such as International Business Machines Corporation, Ariba, Inc., and Microsoft Corporation. UDDI version 3 is the current specification being used for Web service applications and services. Future development and changes to UDDI will be handled by the Organization for the Advancement of Structured Information Standards (OASIS).

Composition service 402 will first try to fulfill the request via history database 405, which stores the results of previously-derived combinations of services. If no applicable previously-derived combination is available, composition logic 403 will be employed to derive a new combination of available services that satisfies the functional requirements of the request. Composition logic 403 is, in a preferred embodiment, software that utilizes information about components in available services database 406 information regarding the combinability of components from combination hints 404 to derive a combination of components meeting the functional requirements of requesting service 400's original request.

Figure 5:
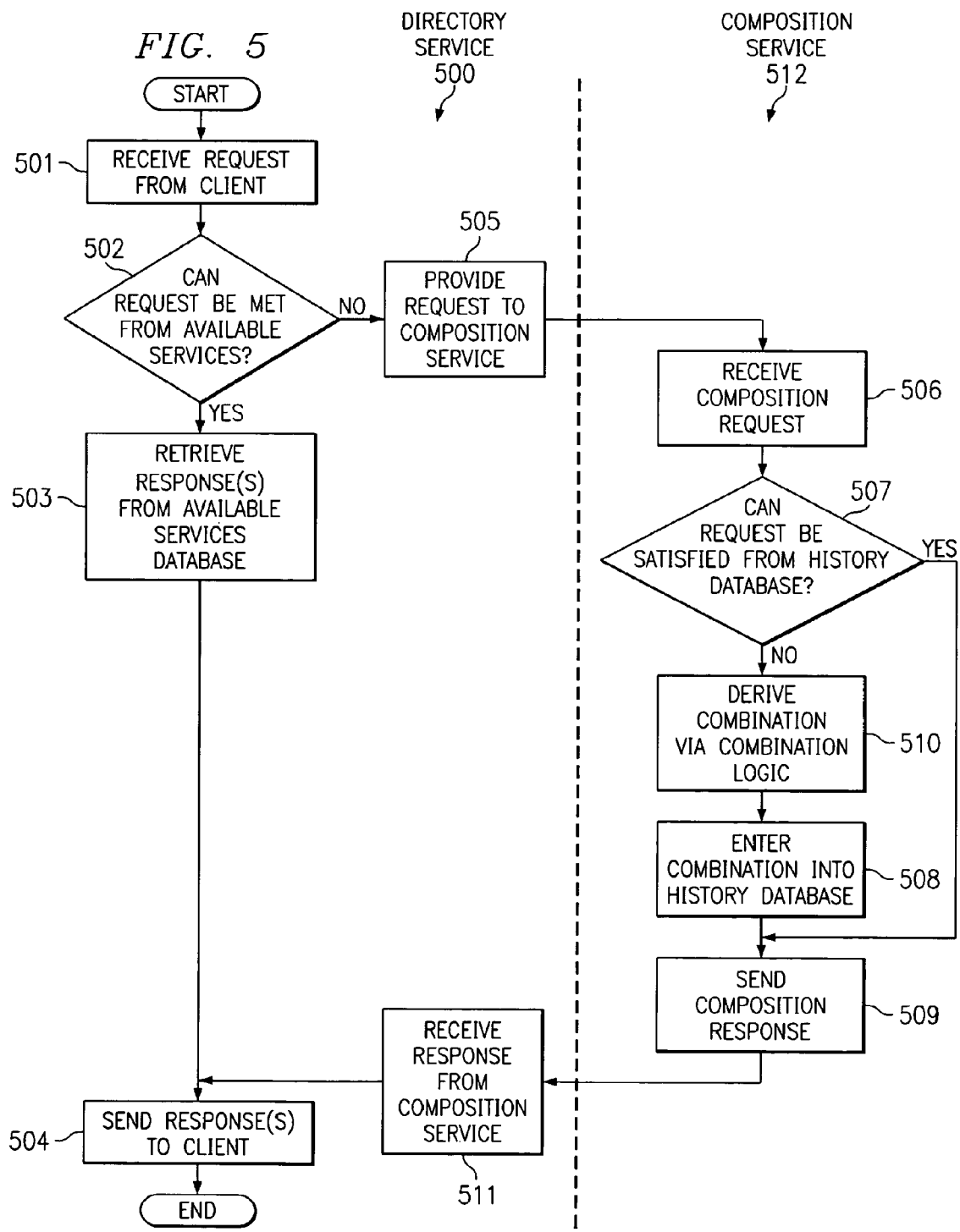
FIG. 5 is a flowchart representation of a process of fulfilling a request for a hardware or software component in a preferred embodiment of the present invention.

FIG. 5 is a flowchart representation of a process for fulfilling requests for services in accordance with a preferred embodiment of the present invention. FIG. 5 is divided into two portions. Directory service portion 500 includes blocks involving identifying and locating individual services (e.g., by directory service 401 in FIG. 4), and composition service portion 512 includes blocks involving the combination of individual services to form meta-services. One of ordinary skill in the art will recognize that this division of blocks may coincide with different software processes (e.g., the blocks in directory service portion 500 are performed by one software process, while the block in composition service 512 are performed by a different software process), or they may not (e.g., one process executes all blocks, or multiple processes execute differently grouped blocks). FIG. 5 assumes that two separate organizational units of software (e.g., processes, threads, functions, subroutines, etc.) are used (i.e., directory service 401 and composition service 402), although, as stated above, no such division is necessary in practice.

Turning now to the process flow represented by FIG. 5, the process begins with a request being received from a client (i.e., a service or component requests additional functionality) (block 501). Next, a determination is made as to whether the request can be met from available services (i.e., available services database 406) (block 502). If so (block 502: Yes), an appropriate response providing instructions regarding the usage of an appropriate service is retrieved from available services database 406 (block 503). This response is then returned to the client to allow the client to make use of the chosen service (block 504).

If the request cannot be met from available services (block 502: No), the request is forwarded to composition service 402 (block 505). Composition service 402 receives the request (block 506) and determines whether the request can be satisfied from history database 405 (block 507). If so (block 507: Yes), a response from history database 405 is returned (block 509). If not (block 507: No), composition logic 403 is used to derive a combination providing the necessary functionality (block 510). This new combination is entered into history database 405 (block 508), and a response returned (block 509). Directory service 401 then receives composition services 402's response (block 511) and returns the response to the client (block 504).

Figure 6:
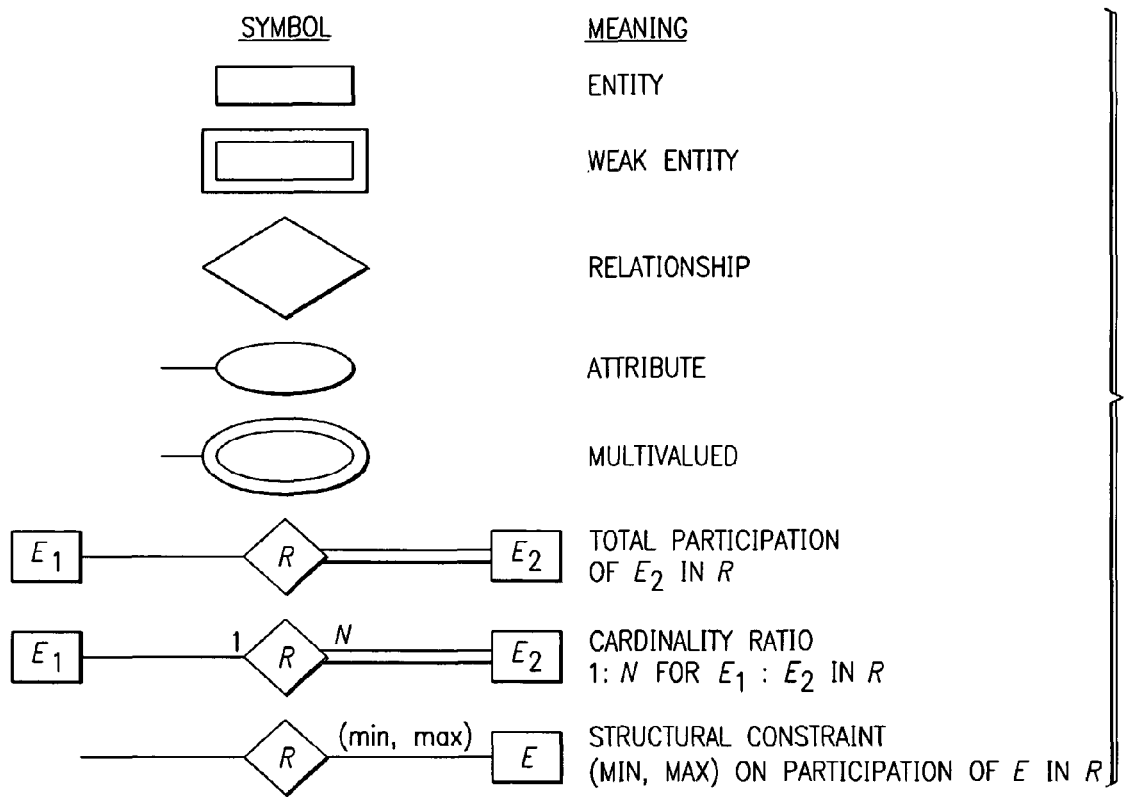
FIG. 6 is a diagram providing a legend for symbols in E-R (entity-relationship diagrams) as used in this document.
Figure 7:
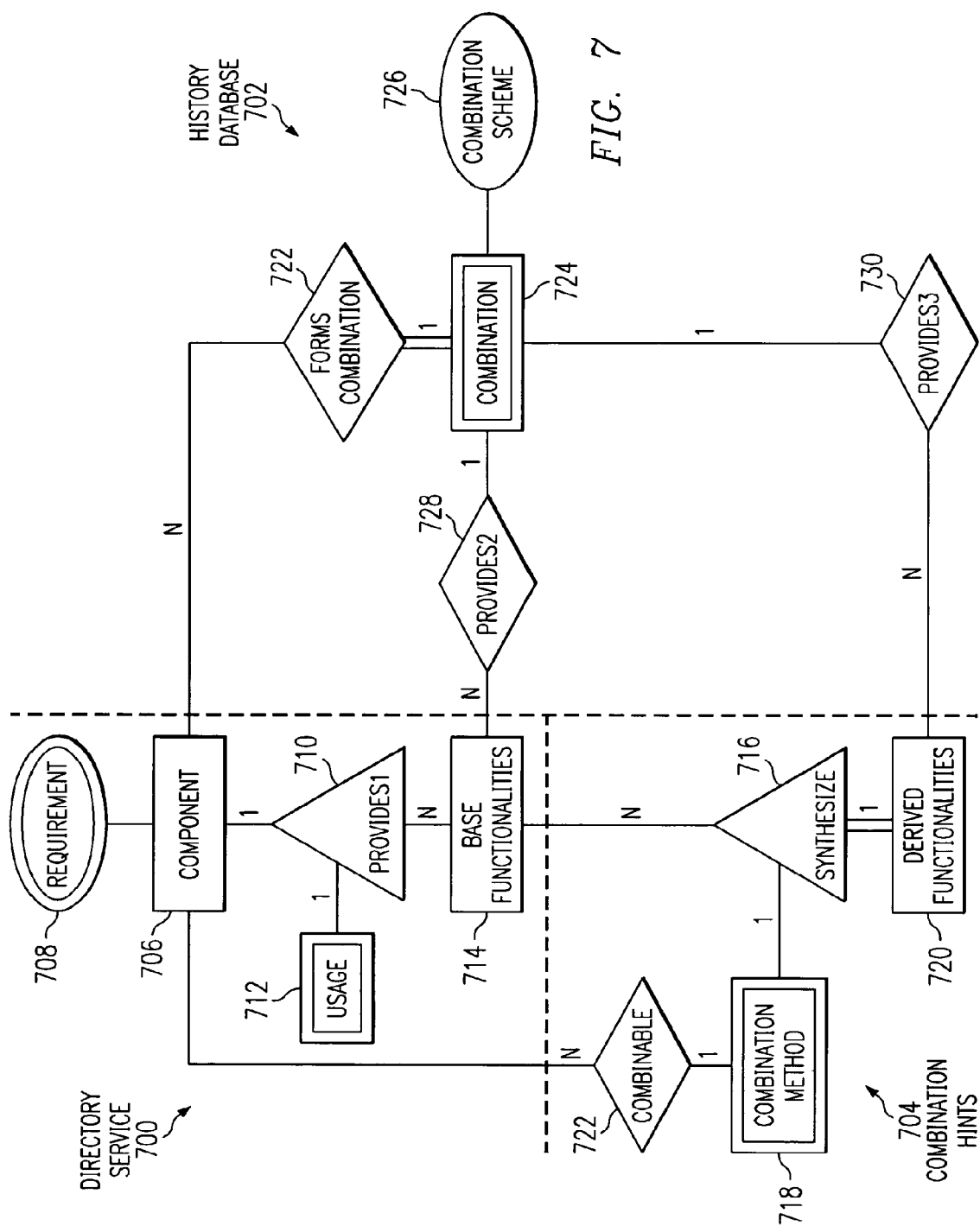
FIG. 7 is an exemplary E-R diagram representing a database system for use in a preferred embodiment of the present invention.

As can be seen from FIGS. 4 and 5, the task of identifying and/or combining services in response to a request involves retrieving data from one or more databases and applying logic to the data (e.g., composition logic 403) to derive an appropriate response. FIGS. 6 and 7 describe one possible database schema that may be employed to store directory, combination, and history information in a preferred embodiment of the present invention. One of ordinary skill in the art will recognize that many variations on and substitutions for the schema described herein are also applicable without departing from the scope and spirit of the present invention. The database schema depicted in the following Figures is included for illustrative purposes only.

The E-R (entity-relationship) approach to database modeling provides a semantics for the conceptual design of databases. With the E-R approach, database information is represented in terms of entities, attributes of entities, and relationships between entities, where the following definitions apply. The modeling semantics corresponding to each definition is illustrated in FIG. 6. FIG. 6 is adapted from Elmasri and Navathe, *Fundamentals of Database Systems*, 3rd Ed., Addison Wesley (2000), pp. 41-66, which contains additional material regarding E-R diagrams and is hereby incorporated by reference.

Entity: An entity is a principal object about which information is collected. For example, in a database containing information about personnel of a company, an entity might be "Employee." In E-R modeling, an entity is represented with a box. An entity may be termed weak or strong, relating its dependence on another entity. A strong entity exhibits no dependence on another entity, i.e. its existence does not require the existence of another Entity. As shown in FIG. 6, a strong entity is represented with a single unshaded box. A weak entity derives its existence from another entity. For example, an entity "Work Time Schedule" derives its existence from an entity "Employee" if a work time schedule can only exist if it is associated with an employee. As shown in FIG. 6, a weak entity is represented by concentric boxes.

Attribute: An attribute is a label that gives a descriptive property to an entity (e.g., name, color, etc.). Two types of attributes exist. Key attributes distinguish among occurrences of an entity. For example, in the United States, a Social Security number is a key attribute that distinguishes between individuals. Descriptor attributes merely describe an entity occurrence (e.g., gender, weight). As shown in FIG. 6, in E-R modeling, an attribute is represented with an oval tied to the entity (box) to which it pertains. In some cases, an attribute may have multiple values. For example, an entity representing a business may have a multivalued attribute "locations." If the business has multiple locations, the attribute "locations" will have multiple values. A multivalued attribute is represented by concentric ovals, as shown in FIG. 6.

Relationships: A relationship is a connectivity exhibited between entity occurrences. Relationships may be one to one, one to many, and many to many, and participation in a relationship by an entity may be optional or mandatory. For example, in the database containing information about personnel of a company, a relation "married to" among employee entity occurrences is one to one (if it is stated that an employee has at most one spouse). Further, participation in the relation is optional as there may exist unmarried employees. As a second example, if company policy dictates that every employee have exactly one manager, then the relationship "managed by" among employee entity occurrences is many to one (many employees may have the same manager), and mandatory (every employee must have a manager).

As shown in FIG. 6, in E-R modeling a relationship is represented with a diamond if it relates one or two entities, and is represented with an n-sided polygon if it relates more than two entities. The cardinality ratio (one-to-one, one-to-many, etc.) in a relationship is denoted by the use of the characters "1" and "N" to show 1:1 or 1:N cardinality ratios, or through the use of explicit structural constraints, as shown in FIG. 6. When all instances of an entity participate in the relationship, the entity box is connected to the relationship diamond by a double line; otherwise, a single line connects the entity with the relationship, as in FIG. 6.

FIG. 7 is an entity-relationship (E-R) diagram of an exemplary database schema that may be applied to a preferred embodiment of the present invention. The schema depicted in FIG. 7 is divided into portions according to the architecture depicted in FIG. 4, namely directory service portion 700, history database portion 702, and combination hints portion 704. One of ordinary skill in the art will recognize that such division is merely conceptual and is not intended to mandate any physical separation of the information in the different portions from each other.

The "base" entity in FIG. 7 is component entity 706, representing a basic "atomic" service, meaning an individual component (service) that is not a composition of other components (services). Each component may have multiple requirements, such as certain minimum hardware requirements or dependencies on other services, represented by multi-valued attribute "requirement" 708.

Ternary relationship "provides1" 710 relates each component (706) with one or more base functionalities (714) under a particular usage (712). Ternary relationship "provides1" 710 denotes that a particular component (706), when used in a certain way (712), provides one or more base functionalities (714).

Ternary relationship "synthesize" 716 relates one or more base functionalities (714) with a combination method (combination method entity 718) and a corresponding derived functionality (derived functionalities entity 720). Ternary relationship "synthesize" 716 denotes that one or more base functionalities (714) may be combined in a certain manner (718) to achieve a derived functionality (720). For example, converting a graphics file from a "BMP" (bitmap) file to "TIFF" (tagged image file format) file might be a base functionality and converting a TIFF file to a "GIF" (graphics interchange format) may be yet another base functionality. Converting from BMP to GIF format would then be a derived functionality achievable by applying the combination method of feeding the output from a BMP-to-TIFF conversion service into a TIFF-to-GIF conversion service. It should be noted that in FIG. 7 ternary relationship "synthesize" 716 relates functionalities, not components. For example, ternary relationship "synthesize" 716 would indicate that any BMP-to-TIFF conversion service may be combined with any TIFF-to-GIF conversion service to yield a BMP-to-GIF conversion meta-service; no indication is made in ternary relationship "synthesize" 716 as to which specific BMP-to-TIFF conversion service should be used.

"Combinable" relationship 722 relates a combination method (718) with one or more components (706). "Combinable" relationship 722 denotes that a particular group of components may be combined according to a particular combination method (718). Thus, in the case of the aforementioned graphics file format conversions, "combinable" relationship 722 would store an indication that two particular conversion services could be combined by feed the output of one into the input of the other. Thus, if a certain functionality must be derived from base functionalities, "combinable" relationship 722 may be consulted to ensure that a particular group of components may be combined in the way necessary to achieve the desired derived functionality.

A combination of components (706) combining a set of base functionalities (714) into a derived functionality (720) is a combination, represented by "combination" entity 724, which is related to entities 706, 714, and 720 via relationships 722, 728, and 730. "Combination scheme" attribute 726 of "combination" entity 724 represents information for forming or using the combination. Combination entity 724 provides a history mechanism for storing already-derived combinations. "Combination scheme" attribute 726 may contain, for example, combination method information (e.g., from "combination method" entity 718), or any other pertinent information for using or forming a combination (such as instructions for forming the combination from individual components or a copy of a combined software component incorporating the code from individual components).

A database schema such as the schema described in FIG. 7 may be implemented using a database management system, such as a relational, object-oriented, object-relational, or deductive database management system. Other data storage paradigms are also possible within a preferred embodiment of the present invention as are available in the art.

Figure 8:
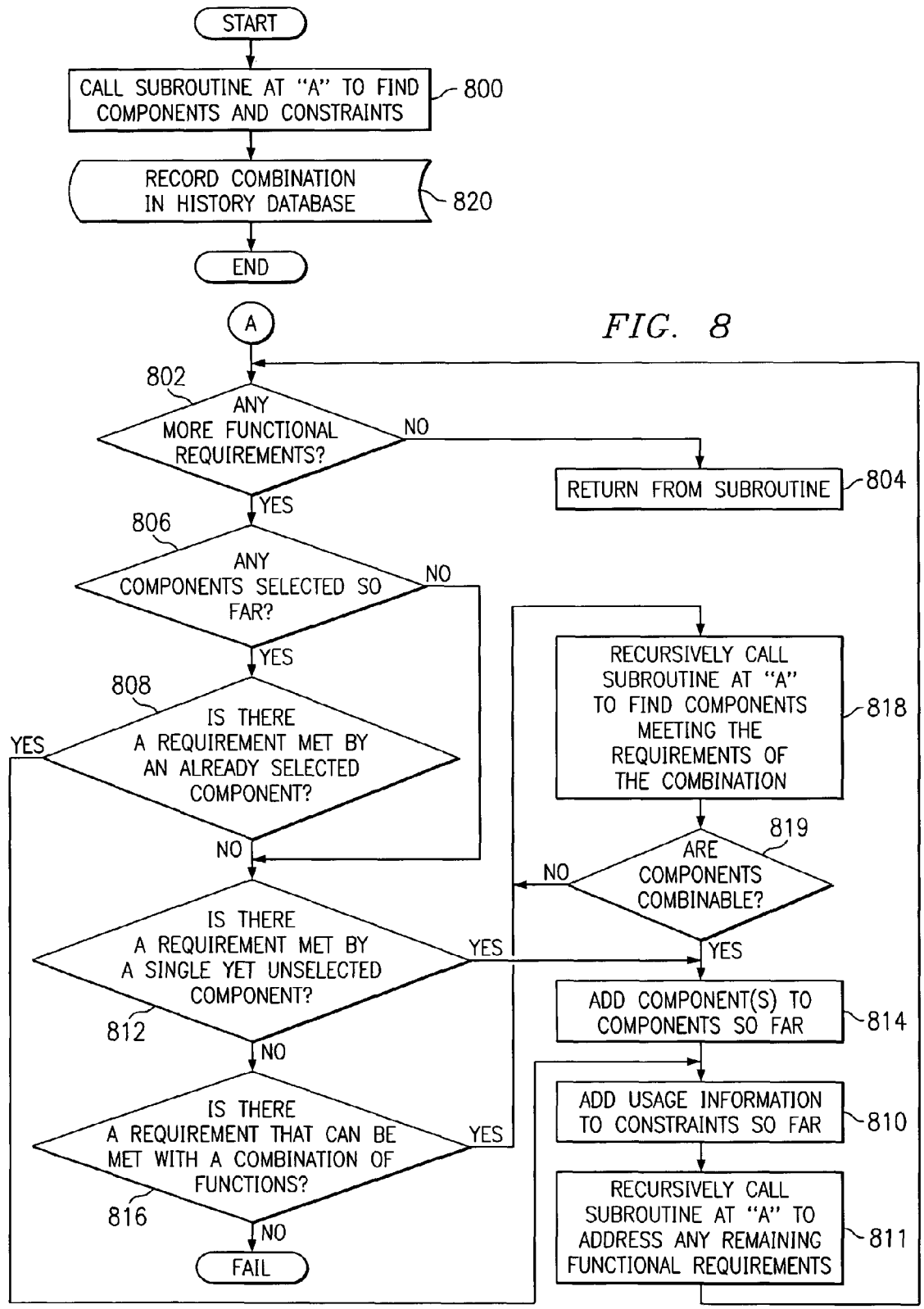
FIG. 8 is a flowchart representation of a process followed by a control logic in accordance with a preferred embodiment of the present invention.

In accordance with a preferred embodiment of the present invention, a database schema such as is described in FIG. 7 is combined with control logic (e.g., such as is provided by directory service 401, composition service 402, and composition logic 403 in FIG. 4) to allow available services to be selected and/or combined in satisfaction of functional requirements. FIG. 8 depicts in flowchart form one possible embodiment of a control logic that may be used in an embodiment of the present invention. The control logic described in FIG. 8 is based on the database schema of FIG. 7 and combines functionalities of directory service 401, composition service 402, and composition logic 403, as described with respect to FIG. 4. As was stated in conjunction with FIG. 4, no rigid separation of directory service 401, composition service 402, and composition logic 403 is required by the present invention. As with the database schema in FIG. 7, the process depicted in FIG. 8 is merely intended to serve as an example of how a control logic may function and is not intended to be limiting.

The process depicted in FIG. 8 begins with calling a subroutine to find the components and constraints associated with the specified functional requirements (block 800). The subroutine called in block 800 is a recursive subroutine to find and/or combine components in satisfaction of each functional requirement specified. As components are incorporated into the solution for each functional requirement, the subroutine is invoked recursively to incorporate additional components and/or combinations in satisfaction of the remaining requirements. When the subroutine is initially invoked, the full list of functional requirements and two empty lists, representing the components and constraints in the solution so far, may be passed into the subroutine as parameters. As the subroutine is repeatedly recursively called, components and constraints are added to the two lists representing the solution so far and functional requirements that have been satisfied by the solution so far are removed from the list of functional requirements.

Each time the subroutine is invoked, a determination is made as to whether any functional requirements remain to be addressed (block 802). If no additional functional requirements remain (block 802: No), the solution so far should be returned as the result (block 804).

If any functional requirements do remain (block 802: Yes), a determination is made as to whether any components have been selected for inclusion in the solution so far (block 806). If so (block 806: Yes), then a determination is made as to whether any of the remaining requirements can be met by components already selected for inclusion in the solution (block 808). If not (block 808: No) or if no components have been selected so far, the process continues to block 812.

If there is a requirement that is met by an already selected component (block 808: Yes), then usage information (i.e., information that instructs a client on how to use the component in question to achieve the desired functionality) is added to the list of constraints in the solution so far (block 810). A recursive call is then made to address any remaining functional requirements (block 811).

In block 812, a determination is made as to whether there is a requirement that may be met by a single component that has not yet been selected for inclusion in the solution so far. If so (block 812: Yes), the component is added to the list of components in the solution so far (block 814), usage information for that component is added to the solution so far (block 810), and the subroutine is recursively called to handle any remaining functional requirements (block 811).

If none of the functional requirements may be satisfied by a single component (block 812: No), a determination is made as to whether a functional requirement may be met with a combination of functions (block 816). If so (block 816: Yes), the subroutine is called recursively to find a set of components meeting the functional requirements needed to achieve the necessary derived functional requirement (block 818). The result of the recursive subroutine call is then checked to see if the components returned by the subroutine may be combined in the necessary way (block 819). If not (block 819: No), the process makes additional subroutine calls to find combinable components (block 818). If a properly combinable set of components is found (block 819: Yes), the components are added to the solution so far (block 814), usage information specifying how to combine and use the components is added to the solution so far (block 810), and the subroutine is called recursively to address any remaining functional requirements (block 811).

Once a solution is returned by the subroutine, the combination derived is stored in the history database (block 820). One of ordinary skill in the art will recognize that a history database may be implemented using conventional database storage techniques or by making modifications to program logic in a language that supports tabled logic programming or self-modifying code, such as Prolog, or through any other appropriate means, not limited to a simple database representation.

Figure 9:
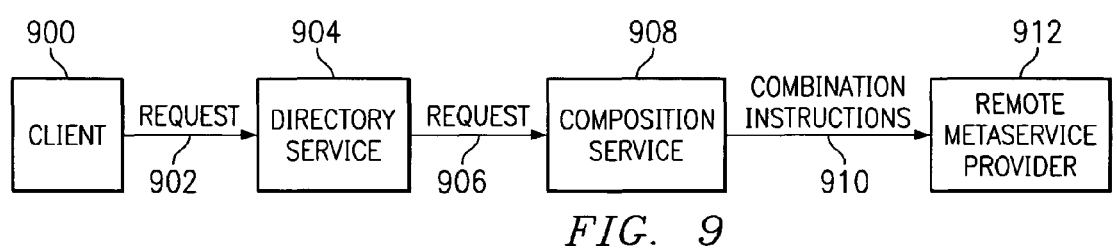
FIG. 9 is a diagram depicting an architectural variation on the present invention in which a remote meta-service provider is used to provide the derived meta-service.

While the preferred embodiment depicted in FIGS. 4-8 assumes that the a directory service or combined directory and composition service will return a response comprising instructions or other information to allow a client to combine and use services (components), a number of other architectural arrangements are also possible. FIG. 9 depicts an embodiment of the present invention utilizing a remote meta-service provider 912. Remote meta-service provider 912 allows the actual combination of services to be performed remotely from client 900. Specifically, client 900 issues a request 902 to directory service 904, which if a combination of services is necessary relays request 906 to composition service 908. Composition service 908 then forwards combination instructions 910 to remote meta-service provider 912. Directory service 904 then responds (914, not shown) to client 900 to notify client 900 that remote meta-service provider 912 is now available to provide the requested functionality. Client 900 may then utilize remote meta-service provider 912 as if it were an individual service providing the requested functionality. Remote meta-service provider 912, however, in actuality serves as an interface to the combination of services making up the "meta-service" according to combination instructions 910.

Figure 10:
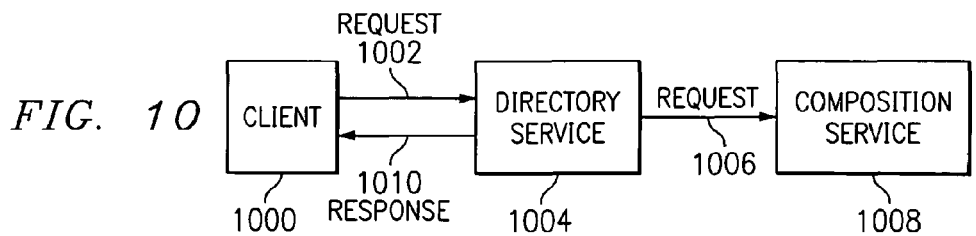
FIG. 10 is a diagram depicting an architectural variation on the present invention in which remote meta-service capability is incorporated into a composition service.

FIG. 10 depicts yet another architectural variation of the present invention in which the remote meta-service provider is incorporated into the composition service used for deriving combinations. Client 1000 issues a request 1002 to directory service 1004, which if a combination of services is necessary relays request 1006 to composition service 1008, which then provides the derived meta-service to client 1000 as would remote meta-service provider 912 in FIG. 9. Directory service 1004 then responds (1010, not shown) to client 1000 to notify client 1000 that composition service 1008 is now available to provide the requested functionality. A variation on the architecture in FIG. 10 would be for directory service 1004 to provide the derived meta-service, rather than composition service 1008.

Additional variations on the present invention are possible. For example, the process of deriving combinations may be done in a distributed fashion, so that multiple solutions are returned from a plurality of composition services operating concurrently and a best solution is chosen from the returned solutions. Another variation is to offer two or more possible combinations to the requesting client, possibly with additional information to be used as selection criteria, and allowing the client to choose one of the possible combinations presented. Another way in which multiple solutions may be supported is for the composition service (or directory service) to query the client for preferences that would aid in choosing a derived combination from a plurality of candidates, so that the composition service (or directory service) could then offer one or more solutions that best fit the client's preferences. For example, the client could be asked whether speed or reliability is a greater concern, and solutions could be offered in which the speed/reliability tradeoff is handled in accordance with the client's needs.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for storing information about hardware and software components comprising:

receiving a request containing a specified functional requirement for a service, wherein the specified functional requirement is in addition to current functional requirements for the hardware and software components deployed in a computing environment, wherein the request is made by a client;

consulting a directory to determine if a single component from the hardware and software components exists that satisfies the specified functional requirement for the service;

in response to a determination that the single component that satisfies the specified functional requirement does not exist, forwarding the request to a composition service;

determining, by the composition service, whether the specified functional requirement can be satisfied from a history database, wherein the history database stores previously-derived combinations of services;

in response to a determination that the composition service can not satisfy the specified functional requirement, employing a composition logic to identifying a plurality of derived functionalities that, when combined according to a combination method, would satisfy the specified functional requirement for the service;

identifying a plurality of components satisfying the plurality of derived functionalities; and storing, information about the plurality of components satisfying the plurality of derived functionalities, into the history database, wherein the plurality of derived functionalities is equivalent to the specified functional requirement for the service.

2. The computer-implemented process of claim 1, further comprising:

verifying that the plurality of components is combinable.

3. The computer-implemented process of claim 1, the process further comprising:

returning the instructions to the client, whereby the client may utilize the plurality of components to achieve the specified functional requirement.

4. The computer-implemented process of claim 1, the process further comprising:

providing the instructions to a remote meta-service provider so that the remote meta-service provider may provide functionality satisfying the specified functional requirement to the client by combining the plurality of components into a meta-service.

5. The computer-implemented process of claim 1, further comprising:
registering an identification of the plurality of components with the directory for future use without reidentifying the plurality of components.

6. The computer-implemented process of claim 1, further comprising:
registering an identification of the plurality of components with a plurality of directories for future use from multiple sources without reidentifying the plurality of components.

7. The computer-implemented process of claim 1, wherein the request is made by a client and the process further comprises:
making an identification of the plurality of components available to services other than the client.

8. The computer-implemented process of claim 1, wherein the request is made by a client and the process further comprises:
identifying a plurality of combinations of components satisfying the plurality of derived functionalities; and
offering the client a choice of a combination from the plurality of combinations.

9. The computer-implemented process of claim 8, wherein offering the client a choice of a combinations from the plurality of combinations further includes:
providing additional information regarding each of the plurality of combinations such that the client may utilize the additional information as selection criteria for choosing a combination from the plurality of combinations.

10. The computer-implemented process of claim 1, wherein the request is made by a client and the process further comprises:
identifying a plurality of combinations of components satisfying the plurality of derived functionalities;
querying the client to determine additional preferences; and
choosing, based on the additional preferences, at least one combination from the plurality of combinations to offer to the client.

11. A computer-readable storage medium storing a computer program product, the computer program product comprising functional descriptive material that, when executed by a computer, enables the computer to perform acts including:
receiving a request containing a specified functional requirement for a service, wherein the specified functional requirement is in addition to current functional requirements for the hardware and software components deployed in a computing environment, wherein the request is made by a client;
consulting a directory to determine if a single component from the hardware and software components exists that satisfies the specified functional requirement for the service;
in response to a determination that the single component that satisfies the specified functional requirement does not exist, forwarding the request to a composition service;
determining, by the composition service, whether the specified functional requirement can be satisfied from a history database, wherein the history database stores previously-derived combinations of services;
in response to a determination that the composition service can not satisfy the specified functional requirement, employing a composition logic to identifying a plurality of derived functionalities that, when combined according to a combination method, would satisfy the specified functional requirement for the service;
identifying a plurality of components satisfying the plurality of derived functionalities; and
storing information about the plurality of components satisfying the plurality of derived functionalities, into the history database, wherein the plurality of derived functionalities is equivalent to the specified functional requirement for the service.

12. The computer program product of claim 11, comprising additional functional descriptive material that, when executed by the computer, enables the computer to perform additional acts including:
verifying that the plurality of components is combinable.

13. The computer program product of claim 11, wherein the computer program product comprises additional functional descriptive material that, when executed by the computer, enables the computer to perform additional acts including:
returning the instructions to the client,
whereby the client may utilize the plurality of components to achieve the specified functional requirement.

14. The computer program product of claim 11, wherein the computer program product comprises additional functional descriptive material that, when executed by the computer, enables the computer to perform additional acts including:
providing the instructions to a remote meta-service provider so that the remote meta-service provider may provide functionality satisfying the specified functional requirement to the client by combining the plurality of components into a meta-service.

15. The computer program product of claim 11, comprising additional functional descriptive material that, when executed by the computer, enables the computer to perform additional acts including:
registering an identification of the plurality of components with the directory for future use without reidentifying the plurality of components.

16. The computer program product of claim 11, comprising additional functional descriptive material that, when executed by the computer, enables the computer to perform additional acts including:
registering an identification of the plurality of components with a plurality of directories for future use from multiple sources without reidentifying the plurality of components.

17. The computer program product of claim 11, wherein the request is made by a client and the computer program product comprises additional functional descriptive material that, when executed by the computer, enables the computer to perform additional acts including:
making an identification of the plurality of components available to services other than the client.

18. The computer program product of claim 11, wherein the request is made by a client and the computer program product comprises additional functional descriptive material that, when executed by the computer, enables the computer to perform additional acts including:
identifying a plurality of combinations of components satisfying the plurality of derived functionalities; and
offering the client a choice of a combination from the plurality of combinations.

19. The computer program product of claim 18, wherein offering the client a choice of a combinations from the plurality of combinations further includes:

providing additional information regarding each of the plurality of combinations such that the client may utilize the additional information as selection criteria for choosing a combination from the plurality of combinations.

20. The computer program product of claim 11, wherein the request is made by a client and the computer program product comprises additional functional descriptive material that, when executed by the computer, enables the computer to perform additional acts including:
   identifying a plurality of combinations of components satisfying the plurality of derived functionalities;
   querying the client to determine additional preferences; and
   choosing, based on the additional preferences, at least one combination from the plurality of combinations to offer to the client.

21. A data processing system comprising:
   means for receiving a request containing a specified functional requirement for a service, wherein the specified functional requirement is in addition to current functional requirements for the hardware and software components deployed in a computing environment, wherein the request is made by a client;
   means for consulting a directory to determine if a single component from the hardware and software components exists that satisfies the specified functional requirement for the service;
   means for, responsive to a determination that the single component that satisfies the specified functional requirement does not exist, forwarding the request to a composition service;
   mean for determining whether the specified functional requirement can be satisfied from a history database, wherein the history database stores previously-derived combinations of services;
   means for, in response to a determination that the composition service can not satisfy the specified functional requirement, employing a composition logic to, identifying a plurality of derived functionalities that, when combined according to a combination method, would satisfy the specified functional requirement for the service;
   means for identifying a plurality of components satisfying the plurality of derived functionalities; and
   means for storing information about the plurality of components satisfying the plurality of derived functionalities, into the history database, wherein the plurality of derived functionalities is equivalent to the specified functional requirement for the service.

22. The data processing system of claim 21, further comprising:
   means for verifying that the plurality of components is combinable.

23. The data processing system of claim 21, wherein the data processing system further comprises:
   means for returning the instructions to the client,
   whereby the client may utilize the plurality of components to achieve the specified functional requirement.

24. The data processing system of claim 21, wherein the data processing system further comprises:
   means for providing the instructions to a remote meta-service provider so that the remote meta-service provider may provide functionality satisfying the specified functional requirement to the client by combining the plurality of components into a meta-service.

25. The data processing system of claim 21, further comprising:
   means for registering an identification of the plurality of components with the directory for future use without reidentifying the plurality of components.

26. The data processing system of claim 21, further comprising:
   means for registering an identification of the plurality of components with a plurality of directories for future use from multiple sources without reidentifying the plurality of components.

27. The data processing system of claim 21, wherein the request is made by a client and the data processing system further comprises:
   means for making an identification of the plurality of components available to services other than the client.

28. The data processing system of claim 21, wherein the request is made by a client and the data processing system further comprises:
   means for identifying a plurality of combinations of components satisfying the plurality of derived functionalities; and
   means for offering the client a choice of a combination from the plurality of combinations.

29. The data processing system of claim 28, wherein offering the client a choice of a combinations from the plurality of combinations further includes:
   means for providing additional information regarding each of the plurality of combinations such that the client may utilize the additional information as selection criteria for choosing a combination from the plurality of combinations.

30. The data processing system of claim 21, wherein the request is made by a client and the data processing system further comprises:
   means for identifying a plurality of combinations of components satisfying the plurality of derived functionalities;
   means for querying the client to determine additional preferences; and
   means for choosing, based on the additional preferences, at least one combination from the plurality of combinations to offer to the client.

* * * * *